(12) United States Patent
Miyauchi et al.

(10) Patent No.: US 11,796,491 B2
(45) Date of Patent: Oct. 24, 2023

(54) X-RAY SPECTROSCOPIC ANALYSIS APPARATUS AND ELEMENTAL ANALYSIS METHOD

(71) Applicant: SHIMADZU CORPORATION, Kyoto (JP)

(72) Inventors: Shinji Miyauchi, Kyoto (JP); Susumu Adachi, Kyoto (JP); Asaka Kohiyama, Kyoto (JP); Takuro Izumi, Kyoto (JP); Takashi Omori, Kyoto (JP); Kenji Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 119 days.

(21) Appl. No.: 17/554,415

(22) Filed: Dec. 17, 2021

(65) Prior Publication Data

US 2022/0214291 A1  Jul. 7, 2022

(30) Foreign Application Priority Data

Jan. 5, 2021 (JP) .................................. 2021-000404
Dec. 1, 2021 (JP) .................................. 2021-195149

(51) Int. Cl.
*G01N 23/207* (2018.01)
*G01N 23/223* (2006.01)

(52) U.S. Cl.
CPC ....... *G01N 23/2076* (2013.01); *G01N 23/223* (2013.01); *G01N 2223/076* (2013.01); *G01N 2223/1016* (2013.01); *G01N 2223/316* (2013.01); *G01N 2223/3306* (2013.01)

(58) Field of Classification Search
None
See application file for complete search history.

(56) References Cited

U.S. PATENT DOCUMENTS

| 4,134,012 A * | 1/1979 | Smallbone ........... G01N 23/223 378/49 |
| 4,807,268 A * | 2/1989 | Wittry ...................... G21K 1/06 378/82 |
| 7,864,922 B2 * | 1/2011 | Kawabe ................ H01J 37/244 378/70 |
| 10,578,566 B2 * | 3/2020 | Yun .................... G01N 23/2209 |

(Continued)

FOREIGN PATENT DOCUMENTS

| JP | 5990734 B2 | 9/2016 |
| JP | 2017223638 A | 12/2017 |
| WO | 2018053272 A1 | 3/2018 |

OTHER PUBLICATIONS

Mortensen, et al. "Benchtop Nonresonant X-ray Emission Spectroscopy: Coming Soon to Laboratories and XAS Beamlines Near You?" (submitted to arXiv Sep. 18, 2015) (Year: 2015).*

(Continued)

*Primary Examiner* — Thomas R Artman
(74) *Attorney, Agent, or Firm* — Muir Patent Law, PLLC (57) ABSTRACT

A spectroscopic element and a detector are disposed along a circumference of one Rowland circle. The spectroscopic element has a spectral surface whose length, measured along the Rowland circle, is shorter than a length in the Rowland circle plane, of an irradiation surface irradiated with excitation beams emitted to a sample holder. The spectroscopic element and the sample holder are disposed to separate a group of characteristic X-rays within a common spectral range of the spectroscopic element.

8 Claims, 11 Drawing Sheets

(56) References Cited

U.S. PATENT DOCUMENTS

| | | | |
|---|---|---|---|
| 10,948,434 B2* | 3/2021 | Sato | G01N 23/2076 |
| 11,054,375 B2* | 7/2021 | Seidler | G01N 23/20091 |
| 2010/0284513 A1* | 11/2010 | Kawabe | G01N 23/2252 |
| | | | 378/45 |
| 2014/0291518 A1* | 10/2014 | Soejima | G01N 23/223 |
| | | | 378/71 |
| 2017/0160213 A1 | 6/2017 | Sato et al. | |
| 2017/0184520 A1* | 6/2017 | Mortensen | G01N 23/20008 |
| 2019/0257774 A1* | 8/2019 | Seidler | G01N 23/2076 |
| 2019/0302042 A1* | 10/2019 | Yun | G01N 23/223 |
| 2022/0003694 A1* | 1/2022 | Seidler | G01N 23/20091 |
| 2022/0214291 A1* | 7/2022 | Miyauchi | G01N 23/223 |

OTHER PUBLICATIONS

Kavčič et al., "Design and performance of a versatile curved-crystal spectrometer for high-resolution spectroscopy in the tender x-ray range", Review of Scientific Instruments 83, 033113 (2012).

Sato et al., "Evaluation of Analytical Precision of Polychromatic Simultaneous WDXRF Spectrometer and Application to Valence Analysis of Cathode Materials of Lithium-Ion Batteries", Analytical Chemistry, vol. 92(1), pp. 758-765, 2020.

Sato et al., "Polychromatic simultaneous WDXRF for chemical state analysis using laboratory X-ray source", X-Ray Spectrometry 2017, 46, 330-335.

\* cited by examiner

X-RAY SPECTROSCOPIC ANALYSIS APPARATUS AND ELEMENTAL ANALYSIS METHOD

BACKGROUND OF THE INVENTION

Field of the Invention

The present disclosure relates to an X-ray spectroscopic analysis apparatus and an elemental analysis method.

Description of the Background Art

An X-ray spectroscopic analysis apparatus has been known as an apparatus that subjects characteristic X-rays (fluorescent X-rays) to spectroscopy and detects the intensity of the characteristic X-rays for each wavelength, the characteristic X-rays being emitted by a sample irradiated with excitation beams such as primary X-rays and electron beams. WO2018/053272 describes as such an X-ray spectroscopic analysis apparatus, an apparatus in which a curved analyzing crystal and a detector are disposed along a circumference of one Rowland circle. In the X-ray spectroscopic analysis apparatus described in WO2018/053272, the curved analyzing crystal collects characteristic X-rays from a light source arranged inside the Rowland circle and simultaneously separates the characteristic X-rays and the detector detects the separated characteristic X-rays.

SUMMARY OF THE INVENTION

In the X-ray spectroscopic analysis apparatus described in WO2018/053272, in separating a group of characteristic X-rays different in peak wavelength from one another with a spectroscopic element such as a curved analyzing crystal, attention is not paid to in which spectral range characteristic X-rays in the group of characteristic X-rays should be separated. When the spectral range is set to cover all peak wavelengths of the group of characteristic X-rays, the spectroscopic element has a spectral surface whose length, measured along the Rowland circle, becomes long. With the long length, owing to a difference in radius of curvature between the Rowland circle and the spectroscopic element, accuracy in detection of characteristic X-rays by the detector is disadvantageously lowered in an area of the spectroscopic element distant from the Rowland circle.

The present disclosure was made in view of such circumstances, and one of objects thereof is to provide an X-ray spectroscopic analysis apparatus capable of accurately detecting characteristic X-rays with a detector.

An X-ray spectroscopic analysis apparatus according to one aspect of the present disclosure includes an excitation source, a curved spectroscopic element, a position-sensitive detector, and a computing unit. The excitation source causes generation of a group of characteristic X-rays different in peak wavelength from one another by emitting excitation beams to a sample held by a sample holder. The curved spectroscopic element separates the group of characteristic X-rays. The position-sensitive detector detects at least some of the group of characteristic X-rays separated by the spectroscopic element. The computing unit analyzes an element contained in the sample based on a result of detection by the detector. The spectroscopic element and the detector are disposed along a circumference of one Rowland circle. The spectroscopic element has a spectral surface whose length, measured along the Rowland circle, is shorter than a length in the Rowland circle plane, of an irradiation surface irradiated with the excitation beams emitted to the sample holder. The spectroscopic element and the sample holder are disposed to separate the group of characteristic X-rays within a common spectral range of the spectroscopic element.

An elemental analysis method according to another aspect of the present disclosure includes generating a group of characteristic X-rays different in peak wavelength from one another by emitting excitation beams to a sample held by a sample holder, causing the generated group of characteristic X-rays to be incident on a curved spectroscopic element, causing the spectroscopic element to separate the incident group of characteristic X-rays, and causing a position-sensitive detector to detect at least some of the separated group of characteristic X-rays, and analyzing an element contained in the sample based on a result of detection by the detector. The spectroscopic element and the detector are disposed along a circumference of one Rowland circle. The spectroscopic element has a spectral surface whose length, measured along the Rowland circle, is shorter than a length in the Rowland circle plane, of an irradiation surface irradiated with the excitation beams emitted to the sample holder. The spectroscopic element and the sample holder are disposed to separate the group of characteristic X-rays within a common spectral range of the spectroscopic element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Each embodiment will be described in detail below with reference to the drawings. The same or corresponding elements in the drawings have the same reference characters allotted and description thereof will not be repeated.

[X-Ray Spectroscopic Analysis Apparatus 10]

Figure 1:
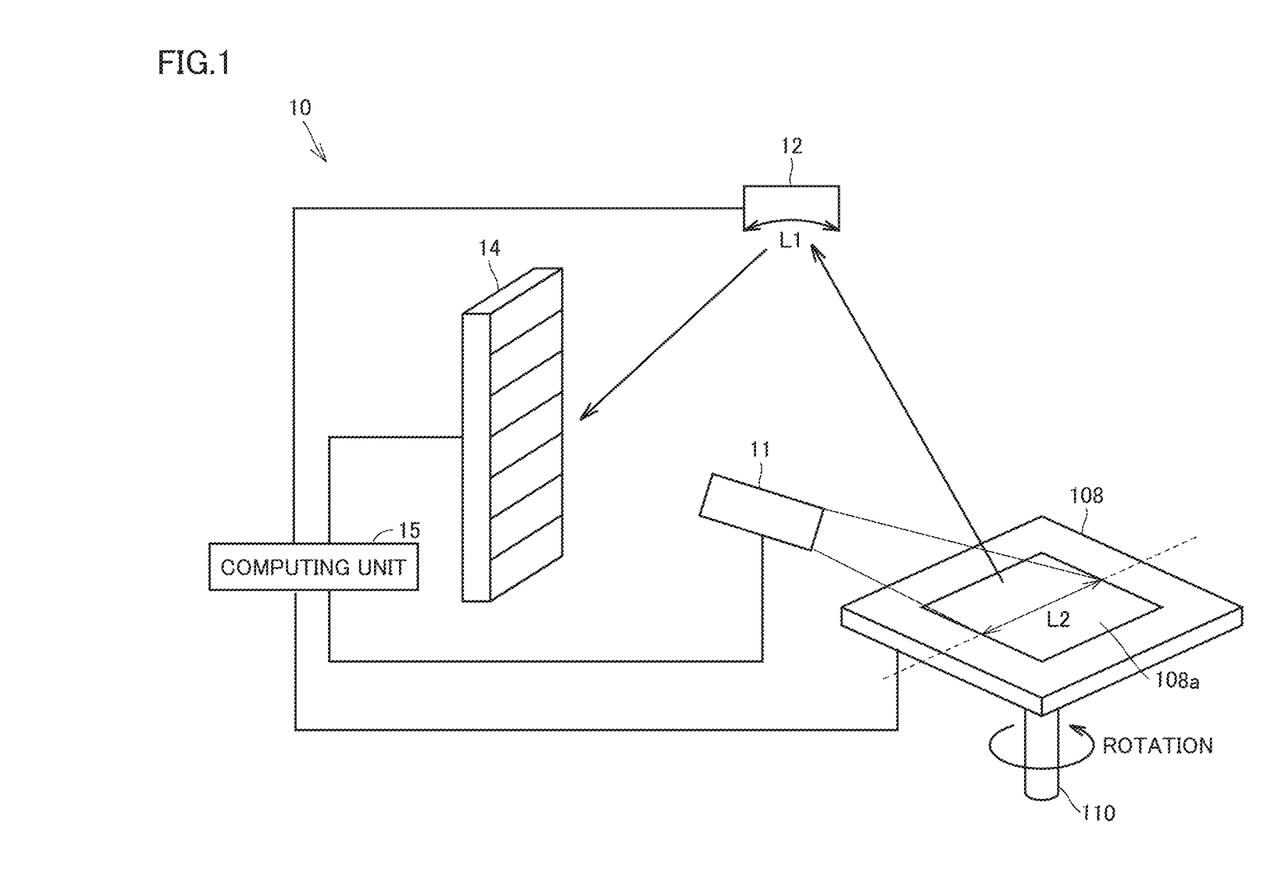
FIG. 1 is a diagram schematically showing an overall configuration of an X-ray spectroscopic analysis apparatus.

FIG. 1 is a diagram schematically showing an overall configuration of an X-ray spectroscopic analysis apparatus 10.

As shown in FIG. 1, X-ray spectroscopic analysis apparatus 10 includes an X-ray tube 11 as an excitation source, a curved spectroscopic element 12, a position-sensitive detector 14, and a computing unit 15.

Computing unit 15 is configured to control operations of X-ray spectroscopic analysis apparatus 10 and to analyze an element contained in a sample based on a result of detection by detector 14. Computing unit 15 is implemented by a processor, a memory, and the like. These components are connected to communicate with one another through a bus.

The processor is typically a computing processing unit such as a central processing unit (CPU) or a micro processing unit (MPU). The processor controls operations of each component of X-ray spectroscopic analysis apparatus 10 by reading and executing a program stored in the memory. The memory is implemented by a non-volatile memory such as a random access memory (RAM), a read only memory (ROM), and a flash memory. A program executed by the processor or data used by the processor is stored in the memory.

X-ray tube 11 causes generation of a group of characteristic X-rays different in peak wavelength from one another (a plurality of characteristic X-rays different in wavelength range from one another) by emitting excitation X-rays (which are also simply referred to as "excitation beams") to a sample held by a sample holder 108. Specifically, sample holder 108 includes a rectangular irradiation surface 108a with each side having a length of L2. Irradiation surface 108a is an opening in sample holder 108 and the entire irradiation surface 108a is irradiated with excitation beams. Since the sample is held within the entire irradiation surface 108a, a group of characteristic X-rays is generated from irradiation surface 108a.

Curved spectroscopic element 12 separates the group of characteristic X-rays that comes from irradiation surface 108a. Position-sensitive detector 14 detects at least some of the group of characteristic X-rays separated by spectroscopic element 12. In the present embodiment, characteristic X-rays generated by excitation with X-rays are also referred to as "fluorescent X-rays" below.

Position-sensitive detector 14 may be a one-dimensional detector. The one-dimensional detector is, for example, a silicon strip detector. By employing the one-dimensional detector as position-sensitive detector 14, reduction in cost for the apparatus can be expected as compared with a charge coupled device (CCD) camera and a complementary metal oxide semiconductor (CMOS) camera which are two-dimensional detectors. Furthermore, time and efforts for reconfiguring two-dimensional data into one-dimensional data are not required.

Computing unit 15 controls X-ray tube 11 to emit excitation beams, obtains a result of detection of the group of characteristic X-rays detected by detector 14, and analyzes an element contained in a sample. Valence (average valence) of the element in the sample can thus be analyzed. In analyzing valence, based on peak energy of characteristic X-rays (peak energy of each X-ray in a group of characteristic X-rays) emitted from a plurality of standard samples different in valence from one another (such a standard sample that an element therein has already been known and valence of the element has already been known), a standard curve that shows peak energy with respect to the valence (for example, a curve that expresses relation between energy and valence with a linear function) is created. The valence is obtained by measuring a sample with X-ray spectroscopic analysis apparatus 10 and applying a value of energy of each X-ray in the group of characteristic X-rays obtained based on the result of detection by detector 14 to the standard curve. X-ray spectroscopic analysis apparatus 10 may include a rotation mechanism 110. Computing unit 15 can control rotation mechanism 110 to rotate sample holder 108. Rotation mechanism 110 will be described later with reference to FIG. 10.

L2 represents a length in a plane of Rowland circle 104 (FIG. 2), of irradiation surface 108a irradiated with excitation beams emitted to sample holder 108. L1 represents a length of a spectral surface of spectroscopic element 12 measured along Rowland circle 104. In the present embodiment, spectroscopic element 12 and detector 14 are disposed along a circumference of one Rowland circle 104. Specific description will be given below with reference to FIG. 2.

Figure 2:
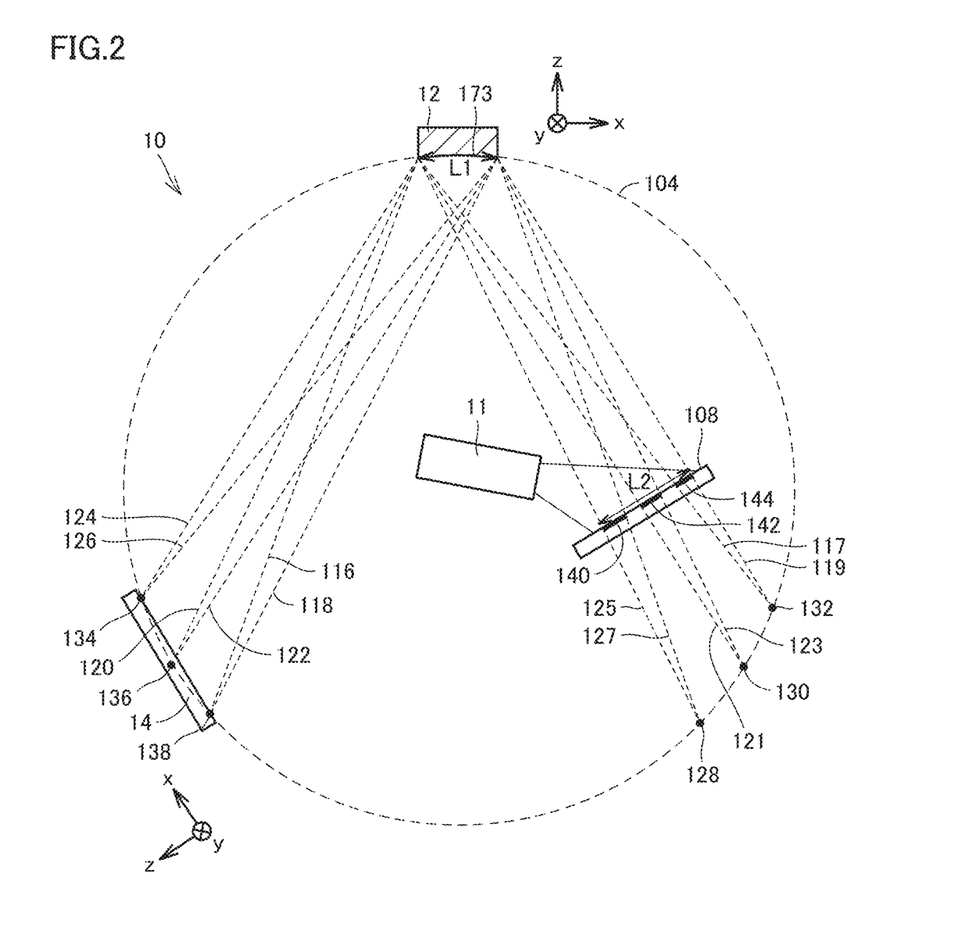
FIG. 2 is a diagram showing relation between the X-ray spectroscopic analysis apparatus and a Rowland circle.

FIG. 2 is a diagram showing relation between X-ray spectroscopic analysis apparatus 10 and Rowland circle 104. As shown in FIG. 2, sample holder 108 and X-ray tube 11 are disposed within Rowland circle 104 having a radius R. A spectral surface of spectroscopic element 12 has a shape and arrangement along the circumference of Rowland circle 104. In the present embodiment, detector 14 is arranged such that a detection surface thereof is in contact with the circumference of Rowland circle 104 not at one point but intersects with the circumference at two points (focuses 134 and 138 in FIG. 2). In general, X-ray spectroscopic analysis apparatus 10 may be required to detect X-rays of a plurality of types of energy (for example, a Kα line and a Kβ line) emitted from a single element and X-rays of different types of energy emitted from a plurality of elements (for example, a Kα line from Mn and a Kα line from Ni). By arranging detector 14 as in the present embodiment, such a requirement can be met. By doing so, X-ray spectroscopic analysis apparatus 10 can detect X-rays of different types of energy at high resolution. Spectroscopic element 12 and detector 14 may have a shape and arrangement different from the above, so long as functions and effects of the present invention are achieved.

Initially, excitation X-rays from X-ray tube 11 are emitted to sample holder 108 within irradiation surface 108a, and fluorescent X-rays specific to an element contained in a sample are generated. Then, the fluorescent X-rays generated from the sample are reflected based on Bragg reflection by spectroscopic element (analyzing crystal) 12 disposed along the circumference of Rowland circle 104 and detected by detector 14 disposed such that the surface thereof intersects with Rowland circle 104 at two points (focuses 134 and 138). Sample holder 108 is desirably disposed such that irradiation surface 108a is perpendicular to a direction of incidence of characteristic X-rays incident on spectroscopic element 12 from irradiation surface 108a, and in the present embodiment, L2 represents a length in an example where irradiation surface 108a is perpendicular. Detector 14 may be disposed along the circumference of Rowland circle 104.

Any sample containing a metal material that generates characteristic X-rays by irradiation with excitation beams, such as a battery or a catalyst, can be employed as the sample. For example, the sample may contain three elements of manganese (Mn), cobalt (Co), and nickel (Ni). In a specific example, the sample may be a lithium ion battery (LIB) containing $Li(Mn_{1/3}Co_{1/3}Ni_{1/3})$ as a positive electrode material. The sample may contain iron (Fe).

In this case, initially, a component of fluorescent X-rays having a first peak wavelength (which is also referred to as a "first wavelength range") and generated from Mn representing one of contained elements, the component being emitted from a first area 140 of a sample surface, reaches a spectral range 173 of spectroscopic element 12 and is reflected based on Bragg reflection, passes through an area shown with optical paths 116 and 118, and is collected at focus 138 on Rowland circle 104.

A virtual focus on the Rowland circle defined by connecting first area 140 and spectral range 173 to each other is shown with a focus 128. Geometrically, fluorescent X-rays can be regarded as being emitted from focus 128 (an area shown with optical paths 125 and 127), passing through the area shown with optical paths 116 and 118, and being collected at focus 138.

A component of fluorescent X-rays having a second peak wavelength (which is also referred to as a "second wavelength range") and generated from Co, the component being emitted from a second area 142 of the sample surface, reaches spectral range 173 of spectroscopic element 12, is reflected based on Bragg reflection, and passes through an area shown with optical paths 120 and 122, and a focus 136 on the Rowland circle is a position of collection of light.

A virtual focus on the Rowland circle defined by connecting second area 142 and spectral range 173 to each other is shown with a focus 130. Geometrically, fluorescent X-rays can be regarded as being emitted from focus 130 (an area shown with optical paths 121 and 123), passing through the area shown with optical paths 120 and 122, and being collected at focus 136.

A component of fluorescent X-rays having a third peak wavelength (which is also referred to as a "third wavelength range") and generated from Ni, the component being emitted from a third area 144 of the sample surface, reaches spectral range 173 of spectroscopic element 12 and is reflected based on Bragg reflection, passes through an area shown with optical paths 124 and 126, and is collected at focus 134 on the Rowland circle.

A virtual focus on the Rowland circle defined by connecting third area 144 and spectral range 173 to each other is shown with a focus 132. Geometrically, fluorescent X-rays can be regarded as being emitted from focus 132 (an area shown with optical paths 117 and 119), passing through the area shown with optical paths 124 and 126, and being collected at focus 134.

Thus, characteristic X-rays (fluorescent X-rays) include a group of characteristic X-rays different in peak wavelength from one another (a plurality of characteristic X-rays different in wavelength range; in this case, characteristic X-rays generated from Mn, Co, and Ni). In the present embodiment, spectroscopic element 12 and sample holder 108 are disposed such that the group of characteristic X-rays is separated within a common spectral range of spectroscopic element 12.

Specifically, as described above, characteristic X-rays generated from any of Mn, Co, and Ni are separated within common "spectral range 173." Spectroscopic element 12 and sample holder 108 are disposed such that the characteristic X-rays are separated within spectral range 173. In the present embodiment, spectroscopic element 12 and sample holder 108 are disposed such that length L1 of the spectral surface of spectroscopic element 12 measured along Rowland circle 104 is shorter than length L2 in the plane of Rowland circle 104, of the irradiation surface irradiated with the excitation beams emitted from sample holder 108.

When the spectral ranges of the group of characteristic X-rays are not common but different, length L1 of the spectral surface of spectroscopic element 12 measured along Rowland circle 104 becomes longer. When spectroscopic element 12 is a Johann type spectroscopic element, a radius of curvature thereof is 2R. In this case, when spectroscopic element 12 has a size large relative to Rowland circle 104 having radius R, displacement from Rowland circle 104 is large in a peripheral portion of spectroscopic element 12, and consequently, defocus due to optical aberration occurs. Accuracy in detection by detector 14 is thus deteriorated.

When the spectral ranges of the group of characteristic X-rays are completely separate from one another and when there is a crystal defect, position displacement of fluorescent X-rays incident on detector 14 occurs, which results in peak shift. Therefore, valence may not correctly be assessed. For example, in WO2018/053272, spectral ranges for a plurality of X-rays are shown with references 171, 173, and 175, respectively (FIG. 2) and they are completely separate from one another. The present embodiment is configured such that the group of characteristic X-rays is separated only within common spectral range 173 and the spectral range of spectroscopic element 12 is small relative to the size of the sample. Effective spectral range 173 of curved spectroscopic element 12 can thus be limited to the vicinity of a region in contact with the circumference of Rowland circle 104 and hence lowering in accuracy in detection of the characteristic X-rays due to difference in radius of curvature between Rowland circle 104 and spectroscopic element 12 can be prevented. Detector 14 can thus accurately detect fluorescent X-rays.

Three advantages as below are thus expected. Firstly, by spectroscopy in common spectral range 173, spectroscopic element 12 can be compact and hence cost for manufacturing spectroscopic element 12 can be reduced. Secondly, in the event that spectroscopic element 12 is defective, the defect can be inspected only by conducting inspection for one element. Thirdly, even when spectroscopic element 12 is defective, there is no peak shift because spectral range 173 is common.

Figure 3:
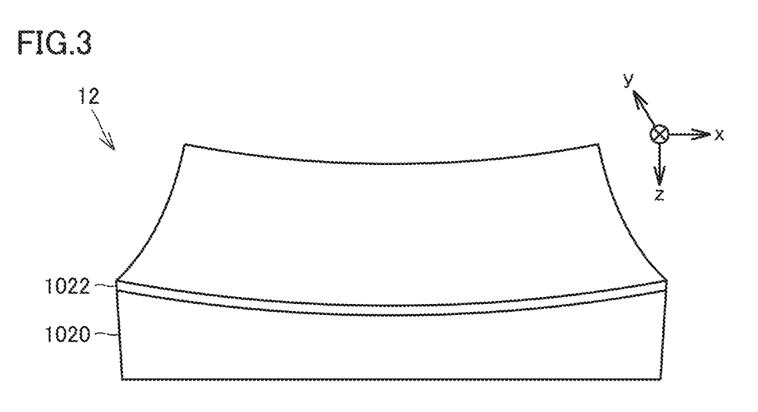
FIG. 3 is a diagram showing an exemplary curved spectroscopic element.

FIG. 3 is a diagram showing exemplary curved spectroscopic element 12. In the present embodiment, as shown in FIG. 3, spectroscopic element 12 is a doubly-curved analyzing crystal.

Spectroscopic element 12 is made by bonding a thin plate 1022 to serve as the analyzing crystal to a base 1020 polished to be curved. A metal such as SUS or low-expansion glass is employed as a material for the base. A single crystal of Si, Ge, LiF, or quartz is suitable for the material of the analyzing crystal.

Length L1 described with reference to FIGS. 1 and 2 refers to a length of the spectral surface of spectroscopic element 12 measured along Rowland circle 104. An x direction in FIG. 3 is a direction along Rowland circle 104 and also referred to as a "direction of spectroscopy" below. A y direction refers to a direction along spectroscopic element 12 perpendicular to the x direction and also referred to as a "direction of collection" below.

Spectroscopic element 12 has a size Wx in the direction of spectroscopy and Wy in the direction of collection. In the example shown in FIGS. 1 and 2, a condition of Wx=L1 and Wy=L1×6 is set, without being limited thereto.

A concave surface of spectroscopic element 12 has a curvature of a radius Rx in the direction of spectroscopy (the x direction) and a radius Ry in the direction of collection (the y direction). An exact solution that gives an optimal curvature is expressed by $Rx=2R$ and $Ry=2R\times\sin^2\theta_B$ where R represents a radius of the Rowland circle and θB represents a Bragg reflection angle determined by a lattice spacing of the analyzing crystal (spectroscopic element 12) and a wavelength of incident X-rays.

An Si strip detector (SSD) is employed as detector 14. By way of example of the SSD, a one-dimensional semiconductor array detector Mythen2 manufactured by Dectris AG (Switzerland) can be employed. Mythen2 has a size of one pixel of 50 μm (the x direction; the direction along Rowland circle 104)×8 mm (the y direction: the direction along the detector perpendicular to the x direction) and has 1280 pixels (channels) integrated in the x direction. A field of view has a total size of 64 mm (the×direction)×8 mm (the y direction).

[Result of Simulation of Projection Image of Kα1 Line of Co]

Figure 4A:
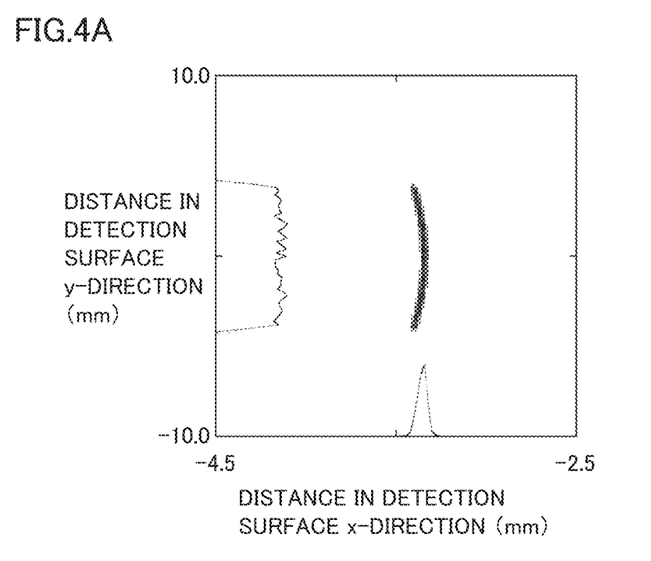
FIGS. 4A and 4B are diagrams showing a result of simulation of a projection image of a Kα1 line of Co viewed from a light reception surface of a detector.
Figure 4B:
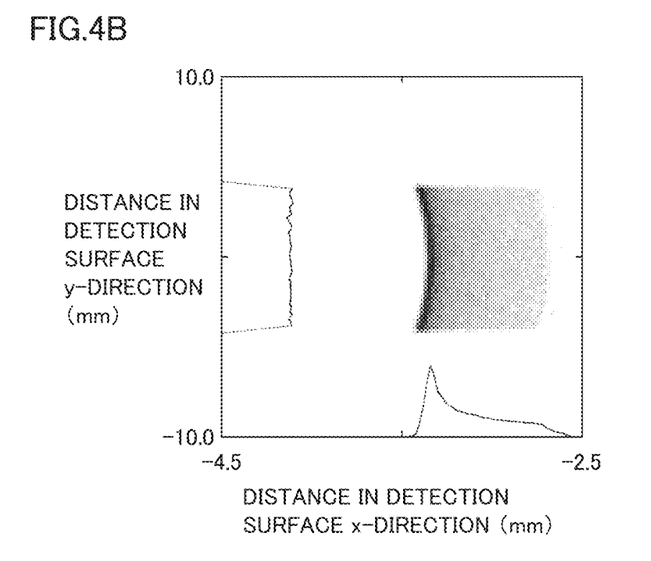

FIGS. 4A and 4B are diagrams showing a result of simulation of a projection image of a Kα1 line of Co viewed from a light reception surface of detector 14.

A direction along Rowland circle 104, of irradiation surface 108a irradiated with excitation beams emitted to sample holder 108 is defined as the x direction and a direction along irradiation surface 108a perpendicular to the x direction is defined as the y direction. L2 described in the example in FIG. 1 represents a length in the x direction of irradiation surface 108a in sample holder 108. The length in the y direction of irradiation surface 108a is also assumed as L2.

FIGS. 4A and 4B each show a result of calculation by Monte Carlo simulation (ray tracing) of what kind of projection image is formed by a CoKα1 line (6.9303 keV) on the detection surface of the detector when it is assumed that the lines are evenly emitted from the irradiation surface (irradiation surface 108a in FIG. 1) of the sample having a size of L2 (the x direction)×L2 (the y direction). A single crystal of Ge(220) is assumed as the analyzing crystal (spectroscopic element 12).

FIG. 4A shows a result of simulation when spectroscopic element 12 has a size of Wx=L1 and Wy=L1×6 and FIG. 4B shows a result of simulation when spectroscopic element 12 has a size of Wx=L1×6 and Wy=L×6. In the present embodiment, it is assumed that relation of L2=L1×4 is satisfied.

In FIG. 4B, trailing in the x direction due to aberration is observed in the detection surface of detector 14. In FIG. 4A, on the other hand, such trailing is not observed, and it can be seen that good spectral characteristics are obtained.

Thus, the example in which spectroscopic element 12 has a size in the x direction of Wx=L1 (FIG. 4B) which is as small as ⅙ is better in spectral characteristics than the example in which spectroscopic element 12 has a size in the x direction of Wx=L1×6 (the example in FIG. 4B).

From the result of simulation, good detection characteristics are obtained by reducing the size Wx (=L1=L2/4) of spectroscopic element 12 to at most ½ or preferably at most ¼ of length L2 in the x direction of irradiation surface 108a in sample holder 108.

In the present embodiment described with reference to FIGS. 1 and 2 as well, L1 (the length of the spectral surface within the spectral range, in the spectral surface of spectroscopic element 12 measured along Rowland circle 104) is designed to be equal to or smaller than ½ of L2 (the length in the plane of Rowland circle 104, of the irradiation surface).

Peak center energy, a half-value breadth, and a peak height of a waveform of fluorescent X-rays of a contained element detected by detector 14 are calculated by data processing with software, and any value thereof is associated with physical characteristics of a sample. For example, peak center energy correlates with a valence electron state of the contained element, and variation in valence of the sample can be known from slight variation in peak center energy. Details are shown in the literature A below.

[Literature A] K. Sato, T. Yoneda, T. Izumi, T. Omori, S. Tokuda, S. Adachi, M. Kobayashi, T. Mukai, H. Tanaka and M. Yanagida, "Evaluation of Analytical Precision of Polychromatic Simultaneous WDXRF Spectrometer and Application to Valence Analysis of Cathode Materials of Lithium-Ion Batteries," Analytical Chemistry, Vol. 92(1), pp. 758-765, 2020.

Kα lines which are fluorescent X-rays of Mn, Co, and Ni are composed of two lines of a Kα1 line and a Kα2 line. Mn has energy of 5898.7 eV of the Kα1 line and 5887.6 EV of Kα2. Co has energy of 6930.3 eV of the Kα1 line and 6915.3 eV of Kα2. Ni has energy of 7478.1 eV of the Kα1 line and 7460.9 eV of Kα2.

In general, measured waveforms of the Kα1 line and the Kα2 line have a peak having a certain finite width under the influence by quantum mechanical fluctuation and noise in a detection system, and tails thereof are detected as overlapping with each other. Therefore, peak separation by curve fitting is preferred, and in order to do so, data on a prescribed energy range (a wavelength range) including both of these lines should be obtained continuously.

At least two times or preferably at least three times as large as an energy difference between the Kα1 line and the Kα2 line is one guideline of an energy range (a wavelength range) suitable for waveform analysis. Though a signal of the Kα line is obtained in the present embodiment, without being limited as such, a signal of a Kβ line may be obtained. In that case, a suitable energy range (wavelength range) can be calculated by replacing the Kα1 line with a Kβ1,3 line and replacing the Kβ2 line with a Kβ' line.

Figure 5A:
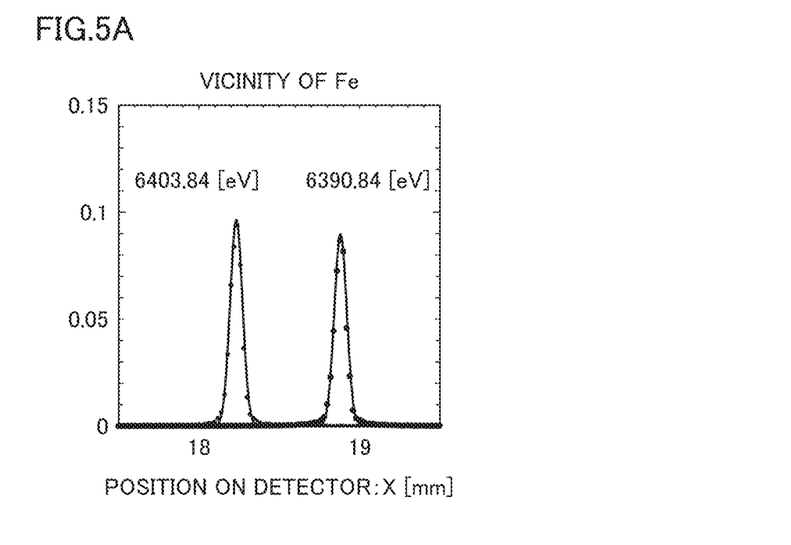
FIGS. 5A to 5C are diagrams showing results of analysis based on a result of detection by the detector.
Figure 5B:
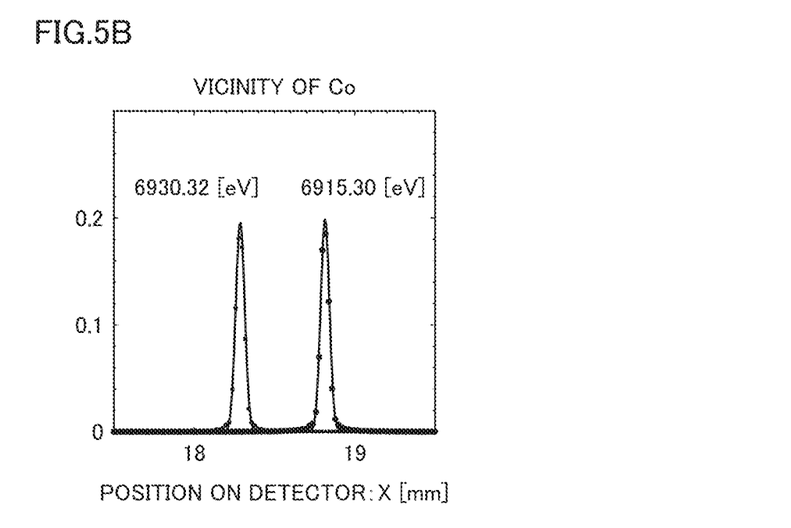
Figure 5C:
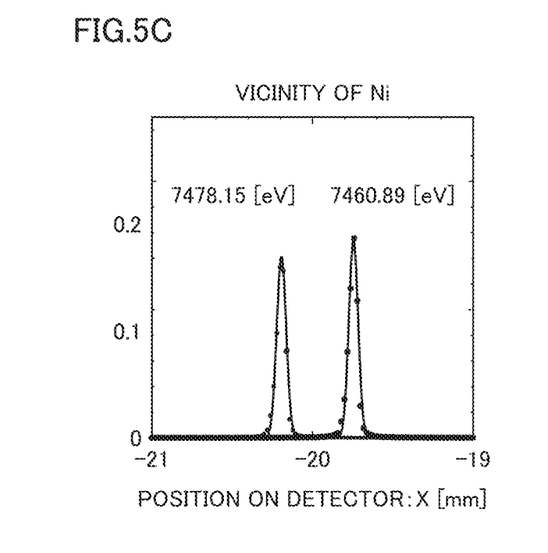

FIGS. 5A to 5C are diagrams showing results of analysis based on a result of detection by detector 14. FIG. 5A shows a result in connection with Fe, FIG. 5B shows a result in connection with Co, and FIG. 5C shows a result in connection with Ni. As shown in FIG. 5A, spectral peaks of Kα1 and Kα2 of Fe are suitably detected at respective prescribed positions in the x direction of detector 14. Spectral peaks of Kα1 and Kα2 are suitably detected also similarly for Co and Ni.

[Modification]

A modification of the present embodiment will be described below.

<First Modification>

In the present embodiment, as shown in FIG. 2, spectral range 173 which is the common spectral range is configured to be delimited by the length (L1) of the spectral surface of spectroscopic element 12 measured along Rowland circle 104.

Without being limited as such, a collimator (collimators 180 to 183) may be provided and the collimator may delimit (determine) the common spectral range. The collimator is disposed on paths of the group of characteristic X-rays from sample holder 108 via spectroscopic element 12 until detector 14.

Figure 6A:
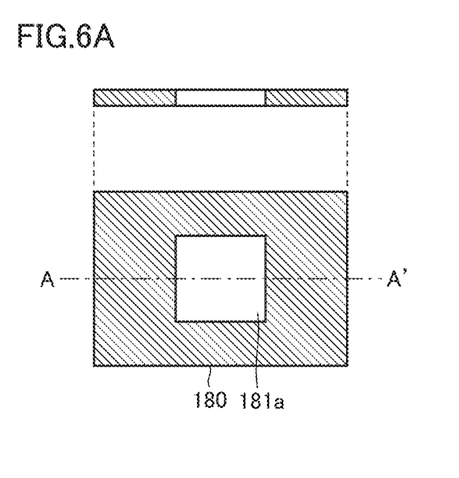
FIGS. 6A and 6B are diagrams each showing an exemplary collimator.
Figure 6B:
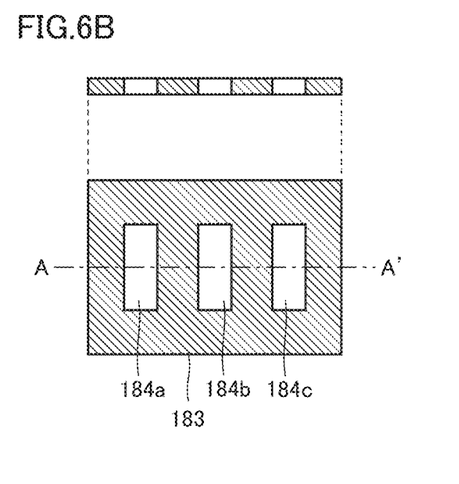

FIGS. 6A and 6B are diagrams each showing an exemplary collimator (collimators 180 and 183). FIG. 6A is a diagram showing a single-aperture collimator 180 and FIG. 6B shows a multiple-aperture collimator 183.

Single-aperture collimator 180 includes a single aperture 181a as shown in FIG. 6A. In contrast, multiple-aperture collimator 183 includes three apertures (apertures 184a to 184c) as shown in FIG. 6B.

Figure 7:
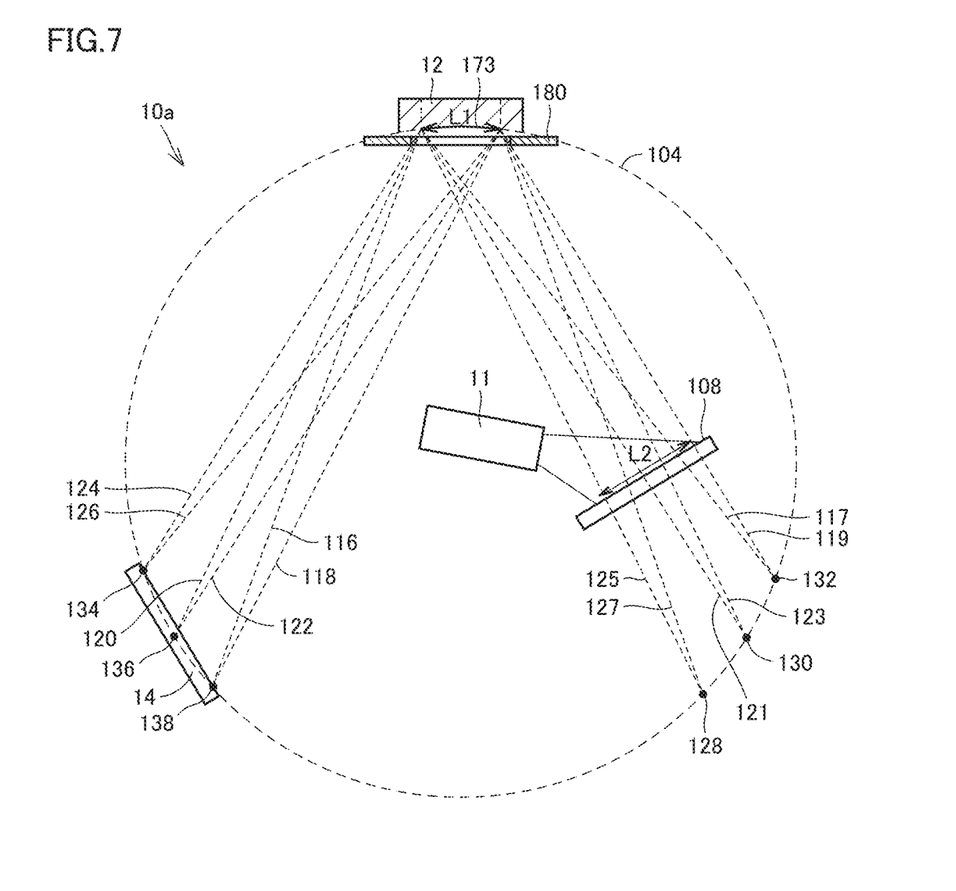
FIG. 7 is a diagram showing relation between an X-ray spectroscopic analysis apparatus and the Rowland circle according to a first modification.

FIG. 7 is a diagram showing relation between an X-ray spectroscopic analysis apparatus 10a and Rowland circle 104 according to a first modification. Since X-ray spectroscopic analysis apparatus 10a is basically the same in configuration as X-ray spectroscopic analysis apparatus 10 except that collimator 180 is further disposed, detailed description will not be provided.

As shown in FIG. 7, collimator 180 is disposed on paths of the group of characteristic X-rays from sample holder 108 via spectroscopic element 12 until detector 14. Specifically, as the collimator is disposed in the vicinity of spectroscopic element 12, common spectral range 173 is narrowed by aperture 181a of collimator 180 and the spectral range is thus delimited.

In other words, common spectral range 173 is delimited depending not on the size of spectroscopic element 12 but on the size of aperture 181a of collimator 180.

Impingement of X-rays as a signal on an end of spectroscopic element 12 may cause generation of unintended scattered radiation. Therefore, by disposing collimator 180 as above, generation of unintended scattered radiation can be prevented.

<Second Modification>

Figure 8:
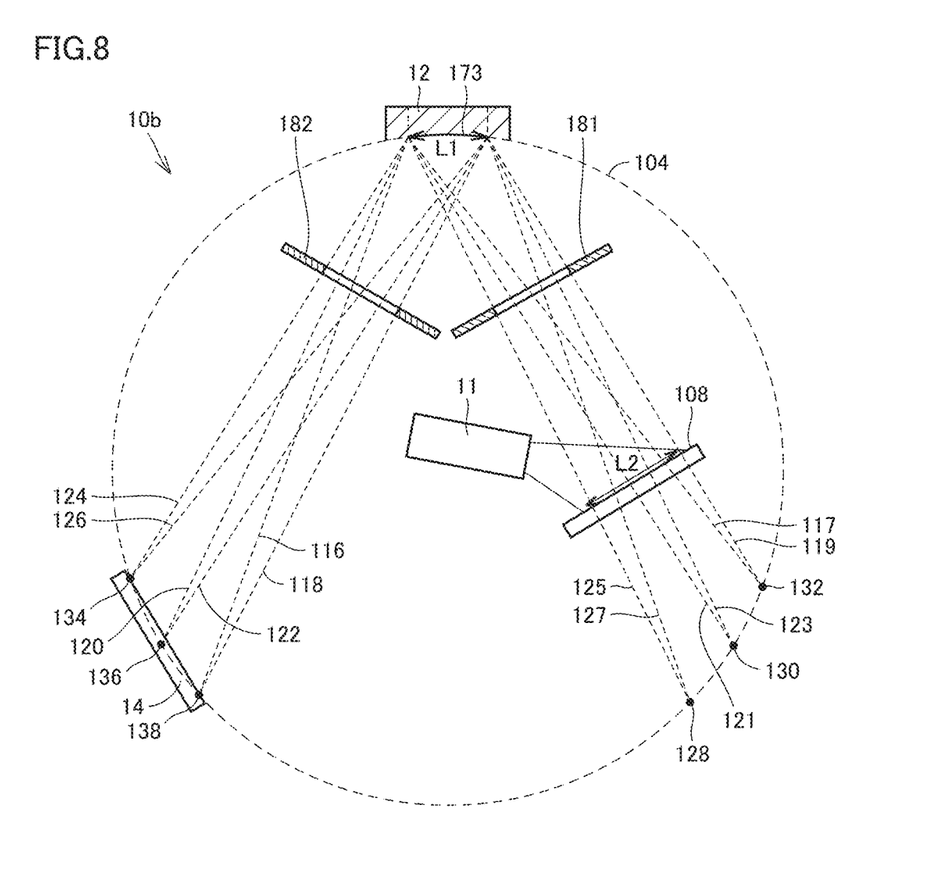
FIG. 8 is a diagram showing relation between an X-ray spectroscopic analysis apparatus and the Rowland circle according to a second modification.

FIG. 8 is a diagram showing relation between an X-ray spectroscopic analysis apparatus 10b and Rowland circle 104 according to a second modification. Since X-ray spectroscopic analysis apparatus 10b is basically the same in configuration as X-ray spectroscopic analysis apparatus 10 except that collimators 181 and 182 are further disposed, detailed description will not be provided. Collimators 181 and 182 are each a single-aperture collimator similarly to collimator 180.

As shown in FIG. 8, collimators 181 and 182 are disposed on paths of a group of characteristic X-rays from sample holder 108 via spectroscopic element 12 until detector 14. Specifically, collimator 181 is disposed on the paths of the group of characteristic X-rays from sample holder 108 until spectroscopic element 12 and collimator 182 is disposed on the paths of the group of characteristic X-rays from spectroscopic element 12 until detector 14. Common spectral range 173 is thus delimited.

<Third Modification>

Figure 9:
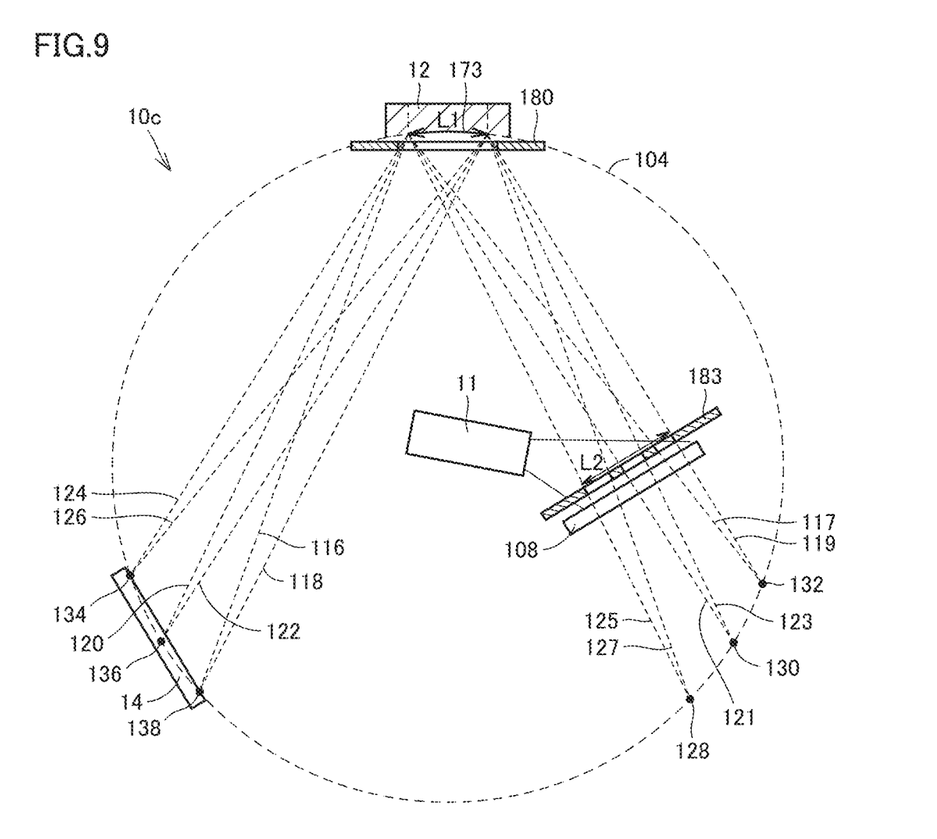
FIG. 9 is a diagram showing relation between an X-ray spectroscopic analysis apparatus and the Rowland circle according to a third modification.

FIG. 9 is a diagram showing relation between an X-ray spectroscopic analysis apparatus 10c and Rowland circle 104 according to a third modification. Since X-ray spectroscopic analysis apparatus 10c is basically the same in configuration as X-ray spectroscopic analysis apparatus 10 except that collimators 180 and 183 are further disposed, detailed description will not be provided.

As shown in FIG. 9, collimators 180 and 183 are disposed on the paths of the group of characteristic X-rays from sample holder 108 via spectroscopic element 12 until detector 14. Specifically, collimator 180 is disposed in the vicinity of spectroscopic element 12 and collimator 183 is disposed in the vicinity of sample holder 108.

Fluorescent X-rays generated from Mn pass through aperture 184a of collimator 183 (an area shown with optical paths 125 and 127), fluorescent X-rays generated from Co pass through aperture 184b of collimator 183 (an area shown with optical paths 121 and 123), and fluorescent X-rays generated from Ni pass through aperture 184c of collimator 183 (an area shown with optical paths 117 and 119). Furthermore, common spectral range 173 is narrowed by aperture 181a of collimator 180 to delimit the spectral range.

The collimator may thus allow passage of light beams in each wavelength range alone (collimator 183). By cutting off X-rays out of the wavelength range of interest, lowering in SN ratio due to scattered radiation can be avoided.

<Fourth Modification>

Figure 10:
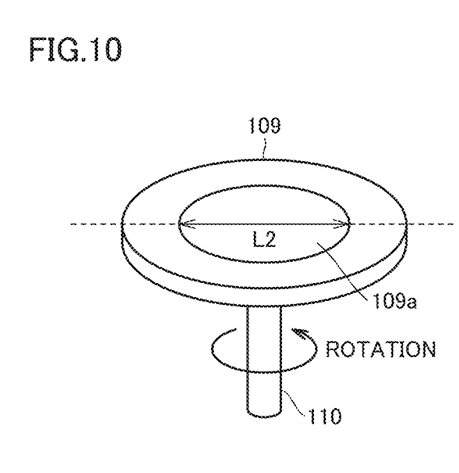
FIG. 10 is a diagram showing a sample holder and a rotation mechanism according to a fourth modification.

FIG. 10 is a diagram showing a sample holder 109 and rotation mechanism 110 according to a fourth modification. In the present embodiment, X-ray spectroscopic analysis apparatus 10 includes rotation mechanism 110. Computing unit 15 can control rotation mechanism 110 to rotate sample holder 108.

In this case, sample holder 108 and irradiation surface 108a are configured as being rectangular. Without being limited as such, rotation mechanism 110 that rotates annular sample holder 109 and an irradiation surface 109a may be provided. Irradiation surface 109a has a diameter L2.

The sample in sample holder 109 is not necessarily held in a uniform state due to a defect or unevenness. When the sample is thus non-uniform, peak intensity calculated based on a result of detection by detector 14 may vary. By rotating sample holder 108 that holds the sample as above, variation in peak intensity can be avoided and high reproducibility in a result of analysis can be expected. X-ray spectroscopic analysis apparatus 10 does not have to include rotation mechanism 110.

<Other Modifications>

Spectroscopic element 12 may be composed of a single crystal of Si, Ge, LiF, or quartz, or synthetic multi-layers may be used for soft X-rays not higher than 2 keV. Diffraction grating as effective as curved crystal may be employed. Curving of spectroscopic element 12 may be a Johann type or a Johansson type.

Spectroscopic element 12 may be curved like a spherical surface or a toroidal surface. So long as a central portion is close to the spherical surface, spectroscopic element 12 may be in another shape such as an elliptical surface or a parabolic surface. Though a curvature in the direction of spectroscopy (the x direction) and the direction of collection (the y direction) is preferably determined to satisfy $Rx=2R$ and $Ry=2R \times \sin^2\theta_B$ as described above, it does not have to strictly match with that. In particular, the direction of collection may be the same in curvature as the direction of spectroscopy in consideration of ease in manufacturing.

Excitation beams may be X-rays, or may be electron beams, neutron lines, or proton beams. Position-sensitive detector 14 may be implemented by a CCD or a CMOS camera that is a two-dimensional detector.

[Aspects]

An illustrative embodiment described above is understood by a person skilled in the art as specific examples of aspects below.

(Clause 1) An X-ray spectroscopic analysis apparatus according to one aspect includes an excitation source, a curved spectroscopic element, a position-sensitive detector, and a computing unit. The excitation source causes generation of a group of characteristic X-rays different in peak wavelength from one another by emitting excitation beams to a sample held by a sample holder. The curved spectroscopic element separates the group of characteristic X-rays. The position-sensitive detector detects at least some of the group of characteristic X-rays separated by the spectroscopic element. The computing unit analyzes an element contained in the sample based on a result of detection by the detector. The spectroscopic element and the detector are disposed along a circumference of one Rowland circle. The spectroscopic element has a spectral surface whose length, measured along the Rowland circle, is shorter than a length in the Rowland circle plane, of an irradiation surface irradiated with the excitation beams emitted to the sample holder. The spectroscopic element and the sample holder are disposed to separate the group of characteristic X-rays within a common spectral range of the spectroscopic element.

According to the X-ray spectroscopic analysis apparatus described in Clause 1, the effective spectral range of the curved spectroscopic element can be limited to the vicinity of an area in contact with the circumference of the Rowland circle. Therefore, lowering in accuracy in detection of characteristic X-rays due to difference in radius of curvature between the Rowland circle and the spectroscopic element can be prevented. The detector can thus accurately detect fluorescent X-rays.

(Clause 2) In the X-ray spectroscopic analysis apparatus described in Clause 2, the detector is arranged such that a surface of the detector intersects with the Rowland circle at two points.

According to the X-ray spectroscopic analysis apparatus described in Clause 2, X-rays of different energy can be detected at high resolution.

(Clause 3) The X-ray spectroscopic analysis apparatus described in Clause 1 further includes a collimator that delimits the common spectral range. The collimator is disposed on paths of the group of characteristic X-rays from the sample holder via the spectroscopic element until the detector.

According to the X-ray spectroscopic analysis apparatus described in Clause 3, unintended generation of scattered radiation from an end of the spectroscopic element can be prevented.

(Clause 4) In the X-ray spectroscopic analysis apparatus described in Clause 1 or 2, the collimator includes a plurality of apertures in correspondence with the group of characteristic X-rays.

According to the X-ray spectroscopic analysis apparatus described in Clause 4, by cutting off characteristic X-rays other than a peak wavelength (wavelength range) of interest, lowering in SN ratio due to scattered radiation can be avoided.

(Clause 5) In the X-ray spectroscopic analysis apparatus described in any one of Clauses 1 to 4, the spectroscopic element has the spectral surface within the spectral range whose length, measured along the circumference of the Rowland circle, is equal to or shorter than ½ the length in the Rowland circle plane, of the irradiation surface.

According to the X-ray spectroscopic analysis apparatus described in Clause 5, the effective spectral range of the curved spectroscopic element can be limited to the vicinity of an area in contact with the circumference of the Rowland circle. Therefore, lowering in accuracy in detection of characteristic X-rays due to difference in radius of curvature between the Rowland circle and the spectroscopic element can be prevented. The detector can thus accurately detect fluorescent X-rays.

(Clause 6) In the X-ray spectroscopic analysis apparatus described in Clauses 1 to 5, the detector is a one-dimensional detector.

According to the X-ray spectroscopic analysis apparatus described in Clause 6, reduction in cost for the apparatus can be expected. Furthermore, time and efforts for reconfiguring two-dimensional data as in a two-dimensional detector into one-dimensional data are not required.

(Clause 7) The X-ray spectroscopic analysis apparatus described in any one of Clauses 1 to 6 further includes a rotation mechanism that rotates the sample holder.

According to the X-ray spectroscopic analysis apparatus described in Clause 7, variation in peak intensity can be avoided and high reproducibility of a result of analysis can be expected.

An elemental analysis method described in Clause 8 includes generating a group of characteristic X-rays different in peak wavelength from one another by emitting excitation beams to a sample held by a sample holder, causing the generated group of characteristic X-rays to be incident on a curved spectroscopic element, causing the spectroscopic element to separate the incident group of characteristic X-rays, and causing a position-sensitive detector to detect at least some of the separated group of characteristic X-rays, and analyzing an element contained in the sample based on a result of detection by the detector. The spectroscopic element and the detector are disposed along a circumference of one Rowland circle. The spectroscopic element has a spectral surface whose length, measured along the Rowland circle, is shorter than a length in the Rowland circle plane, of an irradiation surface irradiated with the excitation beams emitted to the sample holder. The spectroscopic element and the sample holder are disposed to separate the group of characteristic X-rays within a common spectral range of the spectroscopic element.

According to the elemental analysis method described in Clause 8, the effective spectral range of the curved spectroscopic element can be limited to the vicinity of an area in contact with the circumference of the Rowland circle. Therefore, lowering in accuracy in detection of characteristic X-rays due to difference in radius of curvature between the Rowland circle and the spectroscopic element can be prevented. The detector can thus accurately detect fluorescent X-rays.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An X-ray spectroscopic analysis apparatus comprising:
an excitation source that causes generation of a group of characteristic X-rays different in peak wavelength from one another by emitting excitation beams to a sample held by a sample holder;
a curved spectroscopic element that separates the group of characteristic X-rays;
a position-sensitive detector that detects at least some of the group of characteristic X-rays separated by the spectroscopic element; and
a computing unit that analyzes an element contained in the sample based on a result of detection by the detector, wherein
the spectroscopic element and the detector are disposed along a circumference of one Rowland circle,
the spectroscopic element has a spectral surface whose length, measured along the Rowland circle, is shorter than a length in the Rowland circle plane, of an irradiation surface irradiated with the excitation beams emitted to the sample holder, and
the spectroscopic element and the sample holder are disposed to separate the group of characteristic X-rays within a common spectral range of the spectroscopic element.

2. The X-ray spectroscopic analysis apparatus according to claim 1, wherein the detector is arranged such that a surface of the detector intersects with the Rowland circle at two points.

3. The X-ray spectroscopic analysis apparatus according to claim 1, further comprising a collimator that delimits the common spectral range, wherein
the collimator is disposed on paths of the group of characteristic X-rays from the sample holder via the spectroscopic element until the detector.

4. The X-ray spectroscopic analysis apparatus according to claim 3, wherein
the collimator includes a plurality of apertures in correspondence with the group of characteristic X-rays.

5. The X-ray spectroscopic analysis apparatus according to claim 1, wherein
the spectroscopic element has the spectral surface within the spectral range whose length, measured along the circumference of the Rowland circle, is equal to or shorter than ½ the length in the Rowland circle plane, of the irradiation surface.

6. The X-ray spectroscopic analysis apparatus according to claim 1, wherein
the detector is a one-dimensional detector.

7. The X-ray spectroscopic analysis apparatus according to claim 1, further comprising a rotation mechanism that rotates the sample holder.

8. An elemental analysis method comprising:
generating a group of characteristic X-rays different in peak wavelength from one another by emitting excitation beams to a sample held by a sample holder;
causing the generated group of characteristic X-rays to be incident on a curved spectroscopic element, causing the spectroscopic element to separate the incident group of characteristic X-rays, and causing a position-sensitive detector to detect at least some of the separated group of characteristic X-rays; and
analyzing an element contained in the sample based on a result of detection by the detector, wherein
the spectroscopic element and the detector are disposed along a circumference of one Rowland circle,
the spectroscopic element has a spectral surface whose length, measured along the Rowland circle, is shorter than a length in the Rowland circle plane, of an irradiation surface irradiated with the excitation beams emitted to the sample holder, and
the spectroscopic element and the sample holder are disposed to separate the group of characteristic X-rays within a common spectral range of the spectroscopic element.

* * * * *